D. M. Cummings,
Garden Rake,
Nº 11,519. Patented Aug. 15, 1854.
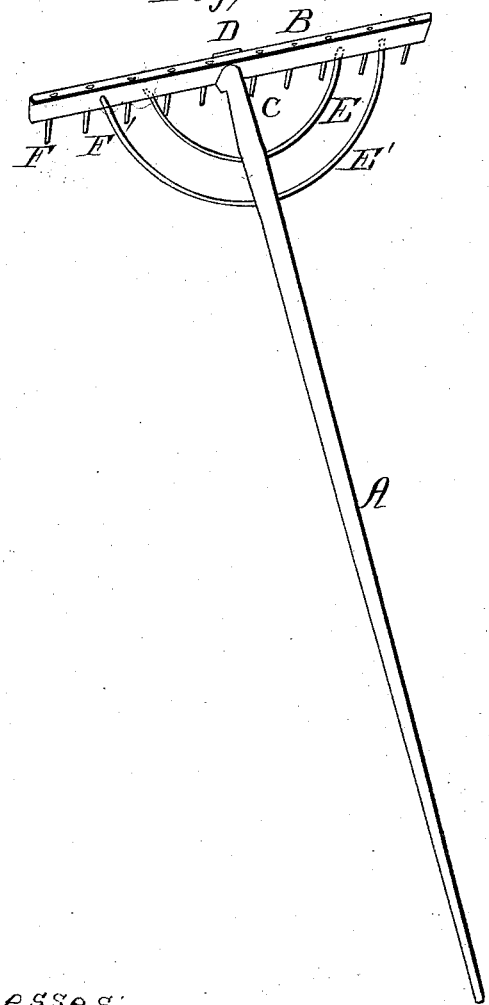
Witnesses;
John Clough
Edmund Burke
Inventor;
D. M. Cummings

UNITED STATES PATENT OFFICE.

D. M. CUMMINGS, OF ENFIELD, NEW HAMPSHIRE.

IMPROVEMENT IN RAKES.

Specification forming part of Letters Patent No. 11,519, dated August 15, 1854.

*To all whom it may concern:*

Be it known that I, DANIEL M. CUMMINGS, of Enfield, in the county of Grafton and State of New Hampshire, have invented a new and Improved Mode of Fastening the Heads of Rakes to Their Handles or Tails; and I do declare that the following is a full and exact description thereof, reference being had to the accompanying drawings, in which—

A is the handle or tail of the rake. B is the head of the rake. C is the head-fastener, (made of malleable iron or other suitable metal,) which is seen in the drawings in Figures 1 and 2, and is provided with a socket (marked c) for the insertion of the handle or tail, and a clasp (marked d) for the insertion and confinement of the head. D is a screw passing through the clasp d, and also the head B, into the head-fastener C, by which the former is firmly fastened and confined to the handle A. E E' are the bows of the rake, and F F' are the teeth of the rake.

From the description above given of the various parts of the rake the improvement which I claim to have invented, its construction, and application will be clearly perceived by all who are skilled in the art of manufacturing that implement.

In the present mode of fastening the head to the handle of the rake, (referring more particularly to the tool used in agriculture,) which is done by boring or mortising the former for the insertion of the latter, the head is greatly weakened, and consequently is easily broken. By my method above described that objection is in a great measure obviated, and the head of the rake and the whole implement are greatly strengthened and rendered more durable; also, if the head or handle shall be broken, or the implement otherwise injured, it is more easily repaired when constructed as above described.

What I claim as my invention, and desire to secure by Letters Patent, is—

The mode of fastening the head of the rake to the handle or tail by the use of the head-fastener C, containing the socket c and the clasp d, in combination with the handle A, head B, and the screw D, as above described, and for the purposes above set forth, or any other mode substantially the same and which will produce the intended effect.

D. M. CUMMINGS.

Witnesses:
    JOHN CLOUGH,
    EDMUND BURKE.